US012743943B2

(12) United States Patent
Thomason et al.

(10) Patent No.: US 12,743,943 B2
(45) Date of Patent: Sep. 22, 2026

(54) COMPUTER-BASED COORDINATION OF INTERACTIVE FENCE ZONES AND INDIVIDUALIZED ALERTS

(71) Applicant: International Business Machines Corporation, Armonk, NY (US)

(72) Inventors: Lowell Thomason, Byron, MN (US); Bradley Smoley, Rochester, MN (US); Jessica Wandrey, Kasson, MN (US); Mark E. Maresh, Oro Valley, AZ (US); Richard Burton Finch, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 18/063,951

(22) Filed: Dec. 9, 2022

(65) Prior Publication Data

US 2024/0194048 A1 Jun. 13, 2024

(51) Int. Cl.
*G08B 1/08* (2006.01)
*G08B 21/10* (2006.01)
*G08B 21/18* (2006.01)

(52) U.S. Cl.
CPC ........... *G08B 21/182* (2013.01); *G08B 21/10* (2013.01)

(58) Field of Classification Search
CPC .............................. G08B 21/182; G08B 21/10
USPC ..................................................... 340/539.13
See application file for complete search history.

(56) References Cited

U.S. PATENT DOCUMENTS

| | | | | |
|---|---|---|---|---|
| 3,825,916 | A | 7/1974 | Steele | |
| 5,868,100 | A | 2/1999 | Marsh | |
| 6,151,276 | A | 11/2000 | Peinetti | |
| 8,624,727 | B2 | 1/2014 | Saigh | |
| 9,285,484 | B2 | 3/2016 | Shima | |
| 9,408,031 | B1 * | 8/2016 | Steger | H04W 4/023 |
| 9,805,582 | B2 | 10/2017 | Jedwab | |

(Continued)

FOREIGN PATENT DOCUMENTS

| | | | |
|---|---|---|---|
| CN | 107071737 | A | 8/2017 |
| CN | 104349279 | B | 7/2018 |

(Continued)

OTHER PUBLICATIONS

Thomason, et al., "Controller Device Based Varying Virtual Fencing", U.S. Appl. No. 17/453,929, filed Nov. 8, 2021, 52 pages.

(Continued)

*Primary Examiner* — Tai T Nguyen
(74) *Attorney, Agent, or Firm* — Jordan T. Schiller

(57) ABSTRACT

Dynamically coordinating interactive fence zones and alerts includes receiving, by one or more processors, location data corresponding to a first object. A virtual fence location and a virtual fence type are determined for the first object based on the received location data, and a first virtual fence is then established surrounding the first object. A plurality of parameters associated with the first virtual fence is received by the one or more processors, and a rule table is generated based on the received plurality of parameters associated with the first virtual fence. Data regarding a virtual fence boundary of the first virtual fence is received by the one or more processors, and based on the received data meeting a first rule of the rule table, an alert is sent to a user device.

20 Claims, 5 Drawing Sheets

(56) References Cited

U.S. PATENT DOCUMENTS

| | | | | |
|---|---|---|---|---|
| 10,307,060 | B2 | 6/2019 | Tran | |
| 10,417,892 | B2 | 9/2019 | Das | |
| 10,421,437 | B1 | 9/2019 | Koskan | |
| 10,650,658 | B2 * | 5/2020 | Bender | H04W 4/022 |
| 10,652,694 | B2 | 5/2020 | Cornwall | |
| 10,735,909 | B1 * | 8/2020 | Klinkner | H04W 64/003 |
| 10,852,151 | B2 | 12/2020 | Butts, III | |
| 11,272,314 | B2 | 3/2022 | Gan | |
| 12,256,284 | B2 | 3/2025 | Thomason et al. | |
| 2012/0284769 | A1 | 11/2012 | Dixon | |
| 2015/0348146 | A1 | 12/2015 | Shanmugam | |
| 2017/0070847 | A1 | 3/2017 | Altman | |
| 2019/0034077 | A1 * | 1/2019 | Krecioch | H04W 4/021 |
| 2021/0374391 | A1 * | 12/2021 | Jorasch | G06V 40/19 |

FOREIGN PATENT DOCUMENTS

| | | | |
|---|---|---|---|
| CN | 106463006 | B | 3/2020 |
| KR | 102256271 | B1 | 5/2021 |

OTHER PUBLICATIONS

Unknown, “StormWatch+”, weather application, last retrieved from internet Oct. 12, 2022, 2 pages, <http://www.stormwatchplus.com/>.

* cited by examiner

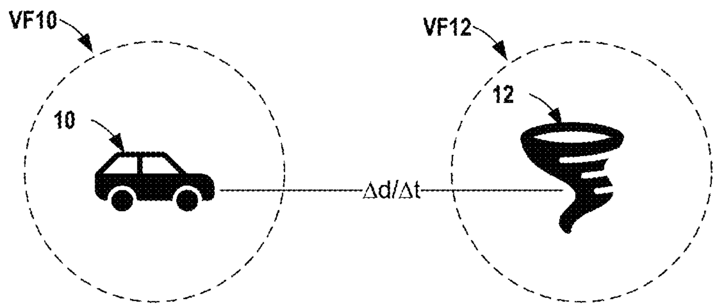

314

| User | Role | Counted In Fence | Speed |
|---|---|---|---|
| User 1 | Supervisor | Yes | 0 |
| User 2 | Storm | Yes | 40 mph |
| User 3 | Vehicle | Yes | 70 mph |

316

| Rule | Size | Number Inside | Action (Storm) |
|---|---|---|---|
| 1 | Variable | 1+ | Adjust size based on storm size, wind speed and movement speed |
| **Rule** | **Size** | **Number Inside** | **Action (Vehicle)** |
| 1 | Variable | 1 | If crosses storm fence, send alert |
| 2 | Variable | 1 | Send alert to registered users, or if no movement in fence within x minutes |

*FIG. 3*

| User | Role | Counted In Fence |
|---|---|---|
| User 1 | Supervisor | No |
| User 2 | Security Guard | Yes |
| User 3 | Security Guard | Yes |
| User 4 | Security Guard | Yes |
| User 5 | Security Guard | Yes |

416

| Rule | Size | Number Inside | Action |
|---|---|---|---|
| 1 | Fixed | 1 | If number of security guards is less than number inside virtual fence (1), send alert to registered users |
| 2 | Fixed | 1 | If no movement in x minutes in any fence, send alert to registered users |

COMPUTER-BASED COORDINATION OF INTERACTIVE FENCE ZONES AND INDIVIDUALIZED ALERTS

BACKGROUND

The present invention generally relates to the field of virtual fencing, and more particularly to dynamically coordinating interactive fence zones and alerts.

A geofence is a virtual perimeter that defines a geographical area utilizing positioning devices and networks, such as, global positioning systems (GPS), radio-frequency identification (RFID), wireless networking technology, or cellular data. The virtual perimeter, also referred to as a virtual fence, can be stationary or nonstationary depending on an application, where a stationary virtual fence is associated with a physical location and a nonstationary virtual fence is associated with a device. A virtual fence is modifiable to user specification within customer sites, manufacturing facilities, and other secure areas to ensure objects or persons do not cross a perimeter as defined by the virtual fence.

SUMMARY

Shortcomings of the prior art are overcome and additional advantages are provided through the provision of a computer-implemented method for dynamically coordinating interactive fence zones and alerts. The method includes receiving, by one or more processors, location data corresponding to a first object, determining, by the one or more processors, a virtual fence location and a virtual fence type for the first object based on the location data, establishing, by the one or more processors, a first virtual fence for the first object, the first virtual fence surrounding the first object, receiving, by the one or more processors, a plurality of parameters associated with the first virtual fence, generating, by the one or more processors, a rule table based on the plurality of parameters associated with the first virtual fence, receiving, by the one or more processors, data regarding a virtual fence boundary of the first virtual fence, and sending, by the one or more processors, an alert to a user device based on the received data meeting a first rule of the rule table.

Another embodiment of the present disclosure provides a computer system for dynamically coordinating interactive fence zones and alerts, based on the method described above.

Another embodiment of the present disclosure provides a computer program product for dynamically coordinating interactive fence zones and alerts, based on the method described above.

BRIEF DESCRIPTION OF THE DRAWINGS

The following detailed description, given by way of example and not intended to limit the invention solely thereto, will best be appreciated in conjunction with the accompanying drawings, in which:

FIG. 3 depicts a first example of an implementation of the computer system for dynamically coordinating interactive fence zones and alerts, according to an embodiment of the present disclosure;

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

The following described exemplary embodiments provide a method, system, and computer program product to, among other things, establish virtual fences around objects, persons or physical locations that can be dynamically adjusted based on generated rule tables, and send alerts to one or more users when virtual fence data meets or traverses a rule in the rule tables. Thus, the present embodiments have the capacity to improve the technical field of virtual fencing by using rule tables for dynamically coordinating interactive fence zones and alerts that can be implemented in numerous situations. Specifically, according to the proposed embodiments, virtual fences can be dynamically adjusted based on environmental conditions, movement, number of users, allowable working conditions, and so on. For example, interactive fence zones and alerts can be established for improving security inside and outside office buildings and warehouses, improving safety in confined spaces or other hazardous locations, improving public safety in natural disaster areas, and coordinating search and rescue efforts.

Figure 1:
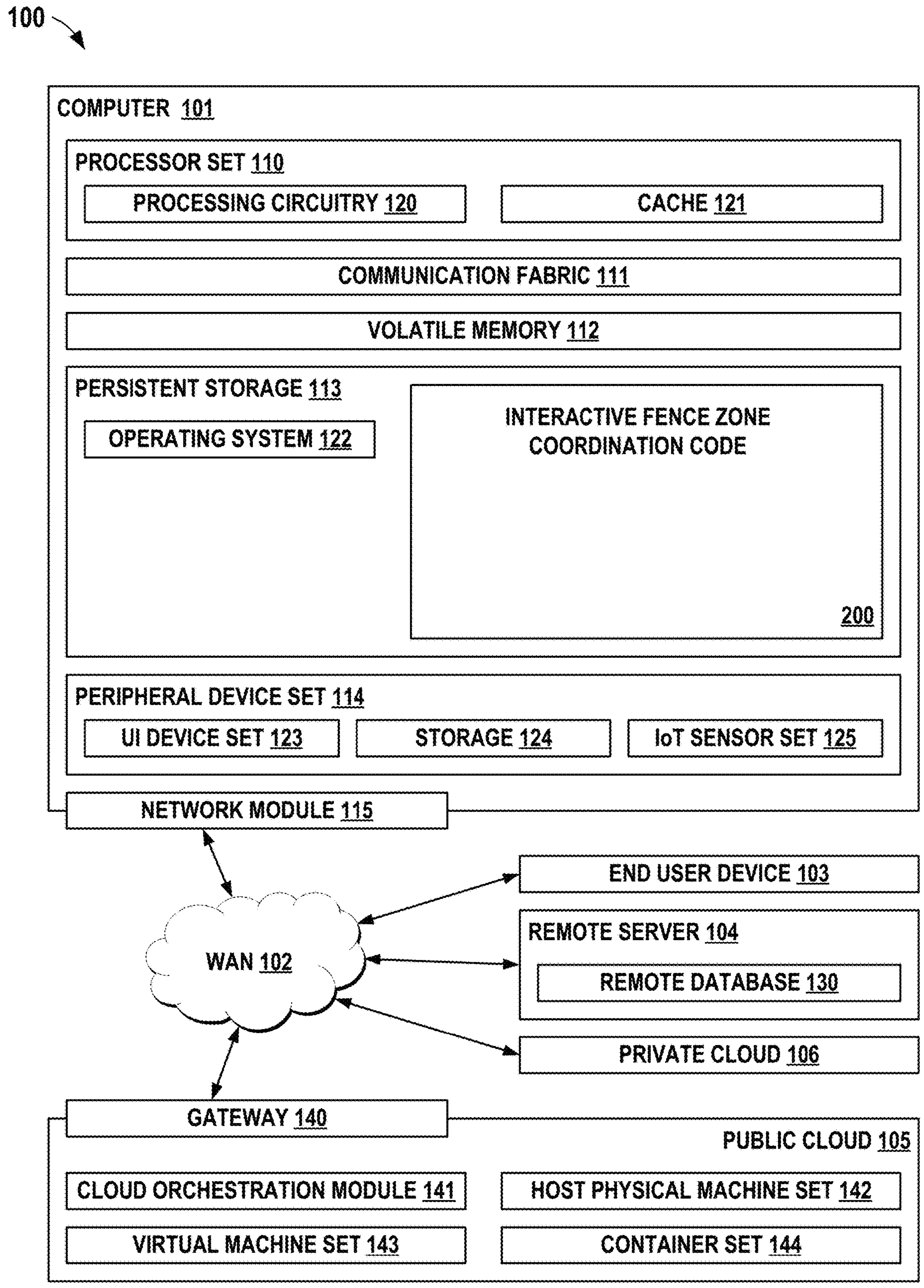
FIG. 1 is a block diagram illustrating a networked computer environment, according to an embodiment of the present disclosure.

Referring now to FIG. 1, an exemplary computing environment 100 is depicted, according to an embodiment of the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as the interactive fence zone coordination code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
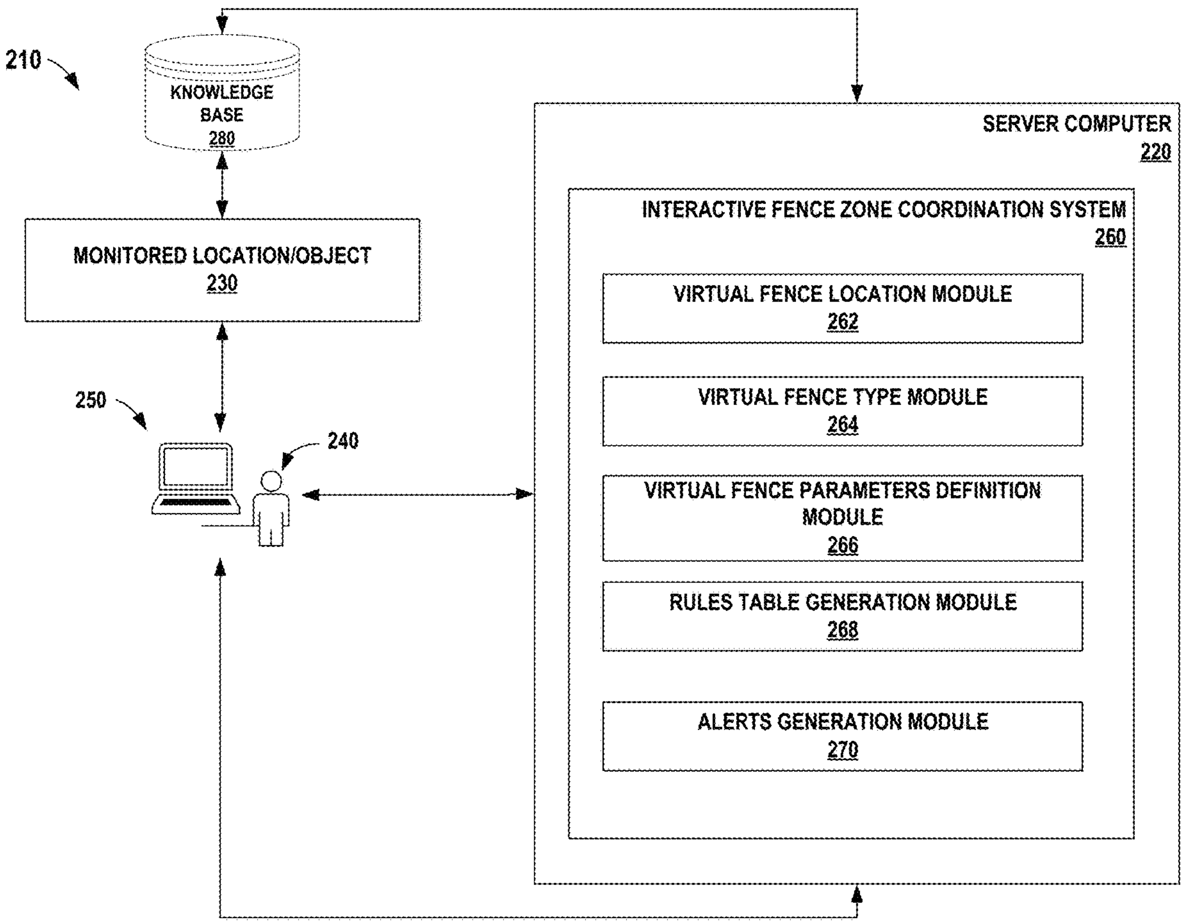
FIG. 2 depicts a computer system for dynamically coordinating interactive fence zones and alerts, according to an embodiment of the present disclosure.

Referring now to FIG. 2, components of a computer system 210 for dynamically coordinating interactive fence zones and alerts are shown, according to an embodiment of the present disclosure.

The computer system 210 includes a server computer 220 provided with an interactive fence zone coordination system 260 and communicatively connected to a monitored location/object 230 and an electronic device 250 of a user 240. It should be noted that the computer system 210 may include one or more electronic devices 250 associated to a respective user 240. For ease of illustration, only one electronic device 250 and one user 240 are depicted in the figure.

Server computer 220 may be a desktop computer, a laptop computer, a tablet computer, a specialized computer server, a smartphone, or any computer system capable of executing the various embodiments of the interactive fence zone coordination system 260. In certain embodiments, server computer 220 represents a computer system utilizing clustered computers and components that act as a single pool of seamless resources when accessed through a network, as is common in data centers and with cloud computing applications. In general, server computer 220 is representative of any programmable electronic device or combination of programmable electronic devices capable of executing machine-readable program instructions and communicating with other computer devices via a network. In this embodiment, server computer 220 has the ability to communicate with other computer devices (e.g., electronic device 250) to query the computer devices for information. The interactive fence zone coordination system 260 in server computer 220 includes the interactive fence zone coordination code 200 (FIG. 1) for dynamically coordinating interactive fence zones and alerts.

In one embodiment, the interactive fence zone coordination system 260 can be a web service accessible via a network (e.g., WAN 102 in FIG. 1) to a user of electronic device 250. In another embodiment, the interactive fence zone coordination system 260 may be operated directly by a user of server computer 220.

Electronic device 250 can be a laptop computer, a tablet computer, a smart phone, smart watch, a smart speaker, IoT device or any programmable electronic device capable of communicating with various components and devices via a network. In general, electronic device 250 represents one or more programmable electronic devices or combination of programmable electronic devices capable of executing machine readable program instructions and communicating with other computing devices (not shown) within the computer system 210 via a network, such as WAN 102 (FIG. 1). In one embodiment, the user 240 of electronic device 250 is monitoring or tracking activities within the monitored location/object 230.

The interactive fence zone coordination system 260 receives from a virtual fence location module 262, location information associated with one or more of electronic device 250 and monitored location/object 230. Virtual fence location module 262 can utilize Global Positioning System (GPS), radio-frequency identification (RFID) triangulation, and/or cellular triangulation to determine a location of one or more of electronic device 250 and monitored location/object 230. The location information can include at least one of: GPS coordinates, a position in a structure (e.g., data center, warehouse, manufacturing facility), a town/city, a county, a state, a region, a providence, and a country.

According to an embodiment, the monitored location/object 230 can include a relocatable or movable object including, for example, a storm, a person, a transportation vehicle, a wireless device, etc. In another embodiment, the monitored location/object 230 may include fixed objects including, for example, a data center, a warehouse, a manufacturing facility, a lake, etc.

Responsive to the received location information, the interactive fence zone coordination system 260 actives the virtual fence type module 264. The virtual fence type module 264 determines a virtual fence type for the monitored location/object 230 based on a dynamic or static condition of the monitored location/object 230 and a purpose of the virtual fence (e.g., security). In some embodiments, a virtual fence type can also be determined for electronic device 250, based on a dynamic or static condition of the electronic device 250 and the purpose of the virtual fence. Specifically, the virtual fence type module 264 of the interactive fence zone coordination system 260 activates a virtual fence according to a location of the monitored location/object 230 and/or electronic device 250 being movable or fixed. Hence, the activated virtual fence can include at least one of a movable (nonstationary) virtual fence and a fixed (stationary) virtual fence with or without overlapping.

Virtual fence type module 264 establishes a virtual fence for one or more of monitored location/object 230 and electronic device 250, where the virtual fence surrounds one or more of the monitored location/object 230 and electronic device 250. Each of the monitored location/object 230 and electronic device 250 may be positioned within an area defined by a virtual perimeter of the virtual fence. In one embodiment, both the virtual fence surrounding monitored location/object 230 and virtual fence surrounding the electronic device 250 are nonstationary and moves with the monitored location/object 230 and electronic device 250. In another embodiment, the virtual fence surrounding the monitored location/object 230 is fixed (stationary), while the virtual fence surrounding the electronic device 250 is nonstationary. In yet another embodiment, only one virtual fence (movable or fixed) is established for the monitored location/object 230.

The interactive fence zone coordination system 260 actives virtual fence parameters definition module 266 responsive to assigning a virtual fence type to at least one of the electronic device 250 and monitored location/object 230. Virtual fence parameters definition module 266 allows user 240 to define a plurality of parameters selected according to the monitored object/location 230 and the purpose of the virtual fence. A parameter table can be generated including each identified parameter associated with the monitored object/location 230 and the virtual fence. In an exemplary embodiment, the plurality of parameters may include, but are not limited to, users of the monitored object/location 230, a role of each user, users counted in the virtual fence, a role of each of the users, and a designator for indicating a position of each user within the virtual fence. In embodiments in which the monitored location/object 230 is a movable object, such as a car or another transportation vehicle, the plurality of parameters may include, for example, a current speed of the movable object.

The interactive fence zone coordination system 260 actives the rule table generation module 268 in which rule tables for dynamically adjusting or coordinating one or more virtual fences are generated based on the defined virtual fence parameters. According to an embodiment, when a rule in the generated rule table is met or exceeded, the interactive fence zone coordination system 260 activates the alerts generation module 270 in which an alert or response action is generated and transmitted to at least, for example, the electronic device 250. In one or more embodiments, the alerts generation module 270 may enable a mechanism (e.g., locks, light, sound, etc.) based on the rule table. For instance, if a maximum threshold number of users within a virtual fence for a monitored location/object 230 is exceeded, then no entrance or access to the monitored location/object 230 is allowed.

In another embodiment, if a user not registered with the interactive fence zone coordination system 260 or not identified in the plurality of parameters is detected, entrance to (or exit from) the fenced location is not allowed (e.g., door is locked). In yet another embodiment, if rules are not met after an amount of time x, a safety mechanism (e.g., lock, light, sound) can be activated in the monitored location/object 230.

In one or more embodiments, the server computer 220 in which the interactive fence zone coordination system 260 runs, may be communicatively connected with a knowledge base 280 for storing information regarding virtual fence locations, preferences of registered users, user parameters, generated rule tables, generated alerts, etc. The information stored in knowledge base 280 provides a history of coordinated fence zones and alerts that may help improving predicting capabilities of the interactive fence zone coordination system 260. It should be noted that data collection (e.g., from IoT devices, mobile devices, etc.) by computer system 210 is done with user's consent via, for example, an opt-in and opt-out feature. The user can choose to stop having his/her information being collected or used. In some embodiments, the user can be notified each time data is being collected. The collected data is envisioned to be secured and not shared with anyone without previous consent. The user can stop data collection at any time.

Referring now to FIG. 2 and FIG. 3 simultaneously, a first example of an implementation of the virtual fence coordination system 260 is shown, according to an embodiment of the present disclosure.

In this embodiment, a weather monitoring company is tracking a storm 12 using the interactive fence zone coordination system 260 of computer system 210. A vehicle 10 carrying a user (e.g., user 240) of the interactive fence zone coordination system 260 is approaching the storm 12. The virtual fence coordination system 260 operating in server computer 220 activates the virtual fence location module 262 for determining a location of storm 12 and vehicle 10. Virtual fence location module 262 uses a GPS system to determine virtual fence locations for vehicle 10 and storm 12. Virtual fence type module 264 assigns a moveable virtual fence VF10 to vehicle 10 and a moveable virtual fence VF12 to storm 12.

Virtual fence type module 264 may also identify the moveable virtual fence VF12 as an adjustable virtual fence based on, for example, a size of storm 12, a wind speed, and a movement path associated with storm 12. Similarly, virtual fence type module 264 may further identify the movable virtual fence VF10 as an adjustable virtual fence based on, for example, a tracked distance $\Delta d$ between vehicle 10 and storm 12. Virtual fence coordination system 260 can recalculate, in real time, a size of the movable virtual fence VF10 based on a change in the tracked distance (or vehicle displacement) over time $\Delta d/\Delta t$. Thus, when vehicle 10 increases its speed and quickly approaches storm 12, the virtual fence coordination system 260 automatically increases a size of the movable virtual fence VF10 such that VF10 touches VF12 faster.

Accordingly, virtual fence parameters definition module 266 generates parameter table 314. Specifically, in this embodiment, parameter table 314 includes a list of users registered with the virtual fence coordination system 260 and their designated role. Parameter table 314 further includes whether the registered users are counted in the virtual fence. In this embodiment, parameter table 314 further includes a speed of storm 12 (User 2) and a speed of vehicle 10 (User 3). A supervisor (User 1) counted in the virtual fence may be located within a fixed location associated with the weather monitoring company.

Based on parameter table 314, rules table generation module 268 generates rule table 316. Rule table 316 includes a list of rules associated with each registered user counted in the VF10 and VF12. In this example, rule table 316 includes rules for VF10 and VF12. For example, for VF12 (Storm) rule table 316 includes a size of VF12, a number of users allowed within VF12 and an action to be implemented if the rule is not met (e.g., adjust VF12 size based on storm size, wind and/or movement speed). Additionally, rule table 316 specifies actions for VF10 (Vehicle), for instance, Rule 1 for vehicle 10 allows only one registered user within VF10, if vehicle 10 crosses VF12, the number of users inside VF10 increases to two (2) registered users, then interactive fence zone coordination system 260 activates alerts generation module 270 to generate and transmit an alert to vehicle 10. It should be noted that, in this exemplary embodiment, there is no overlap between VF10 and VF12. As mentioned above, if the speed of vehicle 10 increases approaching VF12 faster, the virtual fence coordination system 260 automatically increases the size of the movable virtual fence VF10 such that VF10 reaches VF12 faster, this causes VF10 to exceed Rule 1 for vehicle 10 (allowed users >1) and generate an alert to the registered user within vehicle 10, as will explained in detail below.

Alerts generation module 270 generates and sends the alert to vehicle 10 via, for example, an electronic device incorporated within vehicle 10 or a mobile device registered with the interactive fence zone coordination system 260. The alert may include, for example, a notification displayed on a GPS feature available within vehicle 10 including a user device located within vehicle 10. Interactive fence zone coordination system 260 may allow tapping into the GPS feature and providing a new route to vehicle 10 to avoid storm 12. In one or more embodiments, the VF10 can be linked to a weather application, such as The Weather Channel. In some embodiments, VF12 can remain after the event if weather conditions are not favorable.

In an embodiment, interactive fence zone coordination system 260 may allow multiple virtual fences for one event occurring during a duration of storm 12. In another embodiment, interactive fence zone coordination system 260 may allow multiple virtual fences for multiple events occurring during a duration of storm 12.

Figure 4:
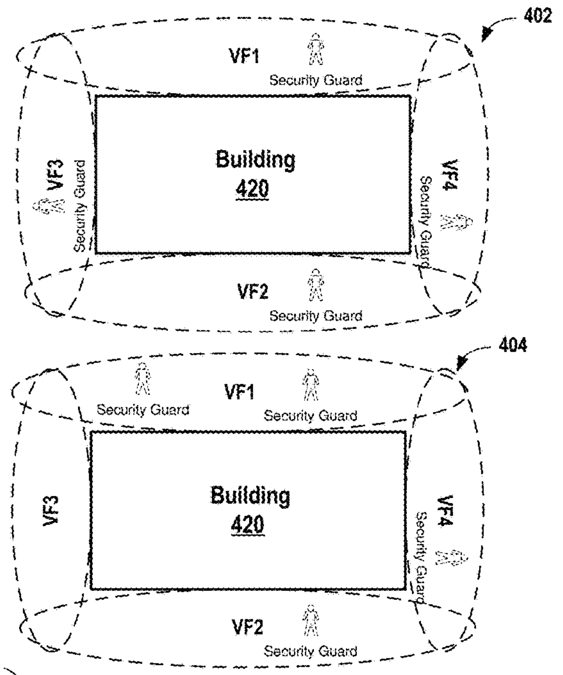
FIG. 4 depicts a second example of an implementation of the computer system for dynamically coordinating interactive fence zones and alerts, according to an embodiment of the present disclosure.

Referring now to FIG. 2 and FIG. 4 simultaneously, a second example of an implementation of the interactive fence zone coordination system 260 is shown, according to an embodiment of the present disclosure.

In this embodiment, monitored location/object 230 includes a building 420 (e.g., a datacenter, a warehouse, a bank, etc.) that needs constant surveillance for security reasons. In this example, a first registered user (e.g., user 240) of the interactive fence zone coordination system 260 may be actively monitoring building 420. The first registered user or User1 may be, for example, a supervisor or security manager of building 420. In response to a surveillance request from the first registered user, interactive fence zone coordination system 260 operating in server computer 220 activates the virtual fence location module 262 for determining a location of building 420. In this embodiment, virtual fence location module 262 uses a GPS system to determine virtual fence locations for building 420. Virtual fence type module 264 assigns fixed or stationary virtual fences VF1, VF2, VF3 and VF4 around a perimeter of building 420 such that all areas surrounding building 420 are covered by virtual fences VF1, VF2, VF3 and VF4, as depicted in first virtual fence diagram 402. In one or more embodiments, first registered user may be located in a building other than building 420.

As building 420 requires continuous security surveillance, virtual fence parameters definition module 266 generates parameter table 414 including a list of users registered with the virtual fence coordination system 260 and their designated role. In this example, parameter table 414 includes the first registered user (i.e., Supervisor or User 1), a list of security personnel available within building 420, and whether they are included in virtual fences VF1, VF2, VF3 and VF4 or not. Accordingly, since security guards must supervise building 420 at all times, rules table generation module 268 generates rule table 416 including a list of rules associated with virtual fences VF1, VF2, VF3 and VF4 based on parameters table 414. Specifically, in this embodiment, rule table 416 includes a size of each virtual fence VF1, VF2, VF3 and VF4, a number of security guards allowed within each virtual fence VF1, VF2, VF3 and VF4, and actions to be executed by the interactive fence zone coordination system 260 when one or more of the rules in rule table 416 are met or traversed. As depicted in first virtual fence diagram 402, at least one security guard must be in each virtual fence at a given time. It should be noted that there may be more than one person in a virtual fence due to corner overlapping of virtual fences VF1, VF2, VF3 and VF4.

Alerts generation module 270 generates and sends an alert to all registered users (e.g., User 1, User 2, User 3, User 4, and User 5) using, for example, a mobile device of each registered user of the interactive fence zone coordination system 260. For instance, second virtual fence diagram 404 depicts a situation in which the security guard in VF3 has moved to another area. Thus, the number of security guards inside VF3 is less than one (1) which violates Rule 1 in rule table 416. The alert generated by alerts generation module 270 may include, for example, a notification displayed on a mobile device, a text message delivered via a mobile device associated with each security guard, an alarm, etc. In some embodiments, the notification may include an indication of the zone within building 420 without a security guard present. In other embodiments, the alert may include automatically locking a door located on the area covered by VF3, i.e., the area left without a security guard. It should be noted that, in this embodiments, virtual fences VF1, VF2, VF3 and VF4 are allowed to overlap. This allows virtual fence coordination system 260 detecting the situation depicted in second virtual fence diagram 404 in which two security guards are located within VF1 and VF3 is empty. In general, interactive fence zone coordination system 260 is capable of dynamically adjusting notifications and alerts based on rule table 416.

Figure 5:
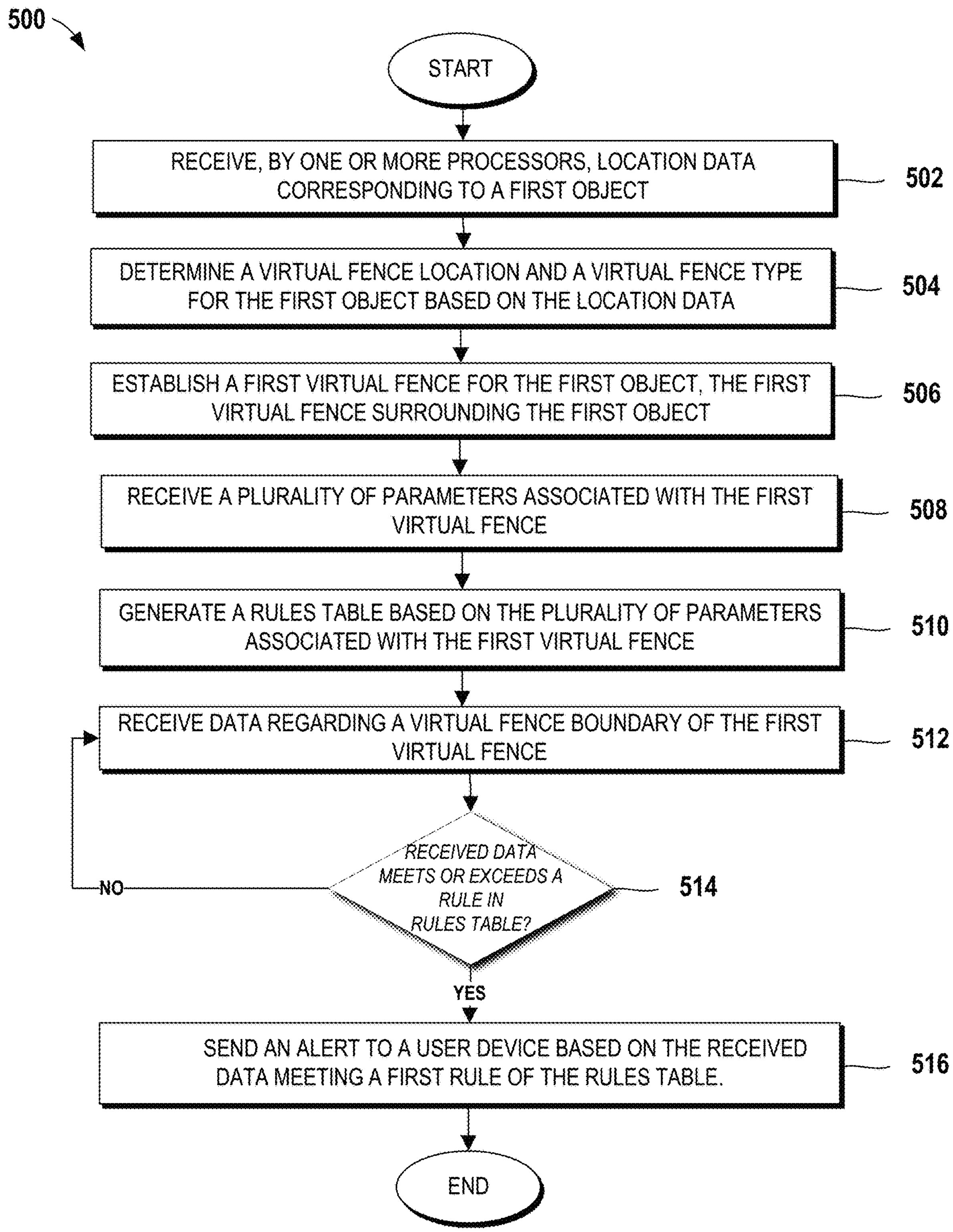
FIG. 5 depicts a flowchart illustrating the steps of a computer-implemented method for dynamically coordinating interactive fence zones and alerts, according to an embodiment of the present disclosure.

Referring now to FIG. 5, a flowchart 500 illustrating the steps of a computer-implemented method for dynamically coordinating interactive fence zones and alerts is shown, according to an embodiment of the present disclosure.

The method starts at step 502 by receiving, by one or more processors, location data corresponding to a first object. At step 504, the one or more processors determine a virtual fence location and a virtual fence type for the first object based on the location data. In one or more embodiments, the virtual fence type is selected based on the location data of the first object including at least one of a fixed location and a movable location. According to an embodiment, a virtual fence associated with the fixed location includes a stationary virtual fence, and a virtual fence associated with the movable location includes a nonstationary virtual fence.

The method continues at step 506 by establishing, by the one or more processors, a first virtual fence for the first object, where the first virtual fence surrounds the first object. At step 508, the one or more processors receive a plurality of parameters associated with the first virtual fence and generates, at step 510, a rule table based on the plurality of parameters associated with the first virtual fence. In an embodiment, the plurality of parameters associated with the first virtual fence may include, but is not limited to, one or more of a user of the first object, a role of the user, users counted in the first virtual fence, a characteristic of the user (e.g., weight) determined based on a purpose of the first virtual fence, and a designator for indicating a position of each user within the first virtual fence. In an embodiment, rules in the rule table may include, but are not limited to, one or more of a size and shape of the first virtual fence, a number of users within the first virtual fence, and an alert activation criteria.

At step 512, the one or more processors receive data regarding a virtual fence boundary of the first virtual fence, and based on the received data meeting a first rule of the rule table at step 514, the method proceeds to send, at step 516, an alert to a user device. In one or more embodiment, the alert is sent to the user device when the received data traverses a second rule of the rule table. In one or more embodiments, the method is capable of automatically adjusting, a size of the first virtual fence based on the rule table.

The method may further include establishing, by the one or more processors, a second virtual fence for a second object, the second virtual fence surrounding the second object, and allowing the first virtual fence and the second virtual fence to overlap based on the rule table. In one or more embodiments, the first object and the second object may be at least one of a person, a physical location, an electronic device, a vehicle, a weather system including storms, hurricanes and tornadoes, and other animate or inanimate objects for which a monitoring request have been received.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for dynamically coordinating interactive fence zones and alerts, comprising:

receiving, by one or more processors, location data corresponding to a first object from a virtual fence location, wherein the location data is derived using a global positioning system (GPS);

determining, by the one or more processors, the virtual fence location and a virtual fence type for the first object based on the location data;

establishing, by the one or more processors, a first virtual fence for the first object, wherein the first virtual fence surrounds the first object;

receiving, by the one or more processors, a plurality of parameters associated with the first virtual fence, wherein the plurality of parameters defines at least one condition for triggering an alert;

generating, by the one or more processors, a rule table based on the plurality of parameters associated with the first virtual fence;

receiving, by the one or more processors, data regarding a virtual fence boundary of the first virtual fence; and sending, by the one or more processors, the alert to a user device based on automated evaluation of the rule table against movement of the first object, wherein the automated evaluation dynamically coordinates alert behavior of the first virtual fence in response to detected movement of the first object.

2. The computer-implemented method of claim 1, further comprising:

sending, by the one or more processors, the alert to the user device when the received data traverses a second rule of the rule table.

3. The computer-implemented method of claim 1, wherein the virtual fence type is selected based on the location data of the first object comprising at least one of a fixed location and a movable location.

4. The computer-implemented method of claim 3, wherein a virtual fence associated with the fixed location comprises a stationary virtual fence, and a virtual fence associated with the movable location comprises a nonstationary virtual fence.

5. The computer-implemented method of claim 1, wherein the plurality of parameters associated with the first virtual fence includes one or more of a user of the first object, a role of the user, users counted in the first virtual fence, a characteristic of the user determined based on a purpose of the first virtual fence and a designator for indicating a position of each user within the first virtual fence.

6. The computer-implemented method of claim 1, wherein rules in the rule table include one or more of a size and shape of the first virtual fence, a number of users within the first virtual fence, and an alert activation criteria.

7. The computer-implemented method of claim 1, further comprising:

automatically adjusting, by the one or more processors, a size of the first virtual fence based on the rule table.

8. The computer-implemented method of claim 1, further comprising:

establishing, by the one or more processors, a second virtual fence for a second object, wherein the second virtual fence surrounds the second object; and allowing, by the one or more processors, the first virtual fence and the second virtual fence to overlap based on the rule table.

9. The computer-implemented method of claim 8, wherein the first object and the second object include one or more of a person, a physical location, an electronic device, a vehicle, a weather system including storms, hurricanes and tornadoes.

10. A computer system for dynamically coordinating interactive fence zones and alerts, comprising:

one or more processors, one or more computer-readable memories, one or more computer-readable tangible storage devices, and program instructions stored on at least one of the one or more computer-readable tangible storage devices for execution by at least one of the one or more processors via at least one of the one or more computer-readable memories, wherein the computer system is capable of performing a method comprising:

receiving, by one or more processors, location data corresponding to a first object from a virtual fence location, wherein the location data is derived using a global positioning system (GPS);

determining, by the one or more processors, the virtual fence location and a virtual fence type for the first object based on the location data;

establishing, by the one or more processors, a first virtual fence for the first object, wherein the first virtual fence surrounds the first object;

receiving, by the one or more processors, a plurality of parameters associated with the first virtual fence, wherein the plurality of parameters defines at least one condition for triggering an alert;

generating, by the one or more processors, a rule table based on the plurality of parameters associated with the first virtual fence;

receiving, by the one or more processors, data regarding a virtual fence boundary of the first virtual fence; and sending, by the one or more processors, the alert to a user device based on automated evaluation of the rule table against movement of the first object, wherein the automated evaluation dynamically coordinates alert behavior of the first virtual fence in response to detected movement of the first object.

11. The computer system of claim 10, further comprising:

sending, by the one or more processors, the alert to the user device when the received data traverses a second rule of the rule table.

12. The computer system of claim 10, wherein the virtual fence type is selected based on the location data of the first object comprising at least one of a fixed location and a movable location.

13. The computer system of claim 12, wherein a virtual fence associated with the fixed location comprises a stationary virtual fence, and a virtual fence associated with the movable location comprises a nonstationary virtual fence.

14. The computer system of claim 10, wherein the plurality of parameters associated with the first virtual fence includes one or more of a user of the first object, a role of the user, users counted in the first virtual fence, a characteristic of the user determined based on a purpose of the first virtual fence and a designator for indicating a position of each user within the first virtual fence.

15. The computer system of claim 10, wherein rules in the rule table include one or more of a size and shape of the first virtual fence, a number of users within the first virtual fence, and an alert activation criteria.

16. The computer system of claim 10, further comprising:
automatically adjusting, by the one or more processors, a size of the first virtual fence based on the rule table.

17. The computer system of claim 10, further comprising:
establishing, by the one or more processors, a second virtual fence for a second object, wherein the second virtual fence surrounds the second object; and
allowing, by the one or more processors, the first virtual fence and the second virtual fence to overlap based on the rule table.

18. The computer system of claim 17, wherein the first object and the second object include one or more of a person, a physical location, an electronic device, a vehicle, a weather system including storms, hurricanes and tornadoes.

19. A computer program product for dynamically coordinating interactive fence zones and alerts, comprising:
one or more computer readable storage media, and program instructions collectively stored on the one or more computer readable storage media, the program instructions comprising:
program instructions to receive, by one or more processors, location data corresponding to a first object from a virtual fence location, wherein the location data is derived using a global positioning system (GPS);
program instructions to determine, by the one or more processors, the virtual fence location and a virtual fence type for the first object based on the location data;
program instructions to establish, by the one or more processors, a first virtual fence for the first object, wherein the first virtual fence surrounds the first object;
program instructions to receive, by the one or more processors, a plurality of parameters associated with the first virtual fence, wherein the plurality of parameters defines at least one condition for triggering an alert;
program instructions to generate, by the one or more processors, a rule table based on the plurality of parameters associated with the first virtual fence;
program instructions to receive, by the one or more processors, data regarding a virtual fence boundary of the first virtual fence; and
program instructions to send, by the one or more processors, the alert to a user device based on automated evaluation of the rule table against movement of the first object, wherein the automated evaluation dynamically coordinates alert behavior of the first virtual fence in response to detected movement of the first object.

20. The computer program product of claim 19, further comprising:
program instructions to send, by the one or more processors, the alert to the user device when the received data traverses a second rule of the rule table.

* * * * *